US007283175B2

(12) United States Patent
Johnson et al.

(10) Patent No.: US 7,283,175 B2
(45) Date of Patent: Oct. 16, 2007

(54) SYSTEM AND METHOD FOR DETERMINING LIP SYNCHRONIZATION BETWEEN AUDIO AND VIDEO IN A DIGITIZED ENVIRONMENT USING BUFFER CALCULATION

(75) Inventors: Devon Matthew Johnson, Fishers, IN (US); Phillip Aaron Junkersfeld, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/533,027

(22) PCT Filed: Oct. 31, 2003

(86) PCT No.: PCT/US03/34644

§ 371 (c)(1),
(2), (4) Date: Apr. 26, 2005

(87) PCT Pub. No.: WO2004/045197

PCT Pub. Date: May 27, 2004

(65) Prior Publication Data

US 2006/0103760 A1 May 18, 2006

Related U.S. Application Data

(60) Provisional application No. 60/424,451, filed on Nov. 7, 2002.

(51) Int. Cl.
*H04N 9/475* (2006.01)
(52) U.S. Cl. ..................................................... 348/515
(58) Field of Classification Search ................ 348/500, 348/512–19, 14.08
See application file for complete search history.

(56) References Cited

U.S. PATENT DOCUMENTS

| 4,698,678 | A |   | 10/1987 | Collins |
|-----------|---|---|---------|---------|
| 4,851,909 | A | * | 7/1989  | Noske et al. ............... 348/512 |
| 5,231,492 | A |   | 7/1993  | Dangi et al. |
| 5,323,272 | A | * | 6/1994  | Klingler ........................ 360/8 |
| 5,512,938 | A | * | 4/1996  | Ohno ........................ 348/14.1 |
| 5,729,516 | A |   | 3/1998  | Tozaki et al. |
| 5,771,075 | A | * | 6/1998  | Rim et al. .................. 348/512 |
| 5,796,912 | A |   | 8/1998  | Sato |
| 5,809,454 | A |   | 9/1998  | Okada et al. |
| 5,880,788 | A | * | 3/1999  | Bregler ....................... 348/515 |
| 5,949,410 | A | * | 9/1999  | Fung ....................... 715/500.1 |
| 6,970,526 | B2| * | 11/2005 | Min ............................ 375/354 |
| 2006/0007356 | A1 | * | 1/2006 | Junkersfeld et al. ........ 348/515 |

OTHER PUBLICATIONS

Search Report Dated Apr. 19, 2004.

* cited by examiner

*Primary Examiner*—Paulos M. Natnael
(74) *Attorney, Agent, or Firm*—Joseph J. Laks; Ronald H. Kurdyla; Vincent E. Duffy

(57) ABSTRACT

The disclosed embodiments relate to a system and method for maintaining synchronization between a video signal and an audio signal that are processed using clocks that are locked. The system may comprise a component that determines at least one initial level of a buffer, a component that determines at least one current level of the buffer, and a component that determines an amount of drift by comparing the at least one initial level of the buffer to the at least one current level of the buffer and adjusts the clocks to maintain the initial midpoint level of the buffer if the amount of drift reaches a threshold level.

22 Claims, 5 Drawing Sheets

SYSTEM AND METHOD FOR DETERMINING LIP SYNCHRONIZATION BETWEEN AUDIO AND VIDEO IN A DIGITIZED ENVIRONMENT USING BUFFER CALCULATION

PRIORITY CLAIM

This application claims the benefit, under 35 U.S.C. § 365 of International Application PCT/US03/34644, filed Oct. 31, 2003, which was published in accordance with PCT Article 21(2) on May 27, 2004 in English and which claims the benefit of U.S. provisional patent application No. 60/424,451, filed Nov. 7, 2002.

FIELD OF THE INVENTION

This invention relates to the field of maintaining synchronization between audio and video signals in an audio/video signal receiver.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Some audio/video receiver modules, which may be incorporated into display devices such as televisions, have been designed with an audio output digital to analog (D/A) clock that is locked to a video output D/A clock. This means that the audio clock and video clock cannot be controlled separately. A single control system may variably change the rate of both clocks by an equal percentage. In some of these systems, a clock recovery system may match the video (D/A) clock to the video source analog to digital (A/D) clock. The audio output D/A clock may then be assumed to match to the audio source A/D clock. This assumption is based upon the fact that broadcasters are supposed to similarly lock their audio and video clocks when the source audio and video is generated.

Although the Advanced Television Systems Committee (ATSC) specification requires broadcasters to lock their video source A/D clock to their audio source A/D clock, there have been instances where these clocks were not locked. Failure of broadcasters to lock the clock of transmitted audio source material with the clock of transmitted video source material may result in a time delay between when the audio presentation should be occurring and when the audio is actually presented. This error, which may be referred to as lip synchronization or lip synch error, may cause the sound presented by the audio/video display device to not match the picture as it is displayed. This effect is annoying to many viewers.

When the audio/video clock recovery is driven by matching the video output rate to the video input rate, the only way to compensate for lip synch error is to time-manipulate the audio output. Because audio is a continuous time presentation, it is difficult to time-manipulate the audio output without have some type of audible distortion, mute, or skip. The frequency of these unwanted audible disturbances is dependent upon the frequency difference between the relative unlocked audio and video clocks at the broadcast station. ATSC sources have been observed to mute the audio every 2-3 minutes. The periodic muting of the audio signal may produce undesirable results to the viewer of the television.

One method of maintaining lip synch between digitized audio and video may include making specific measurements of the audio and video buffers and interpreting this information to determine the lip synch offset in time. In a streaming application, however, it is difficult to know the exact buffer level of a buffer because of the nature of data streams (e.g., video and audio data streams) and receiving buffers. The buffer level cannot be easily read because it is always changing. In other words, merely reading the buffer level at a given point in time may not prove accurate because the buffer level may be constantly changing over time.

One approach to determining the operating point of a buffer is to average buffer levels over time. However, averaging the buffer level may lead to skewed results if the window of time that is observed includes partial buffer fills or drains, or if playback is interrupted, for example, by an early fill midway.

SUMMARY OF THE INVENTION

The disclosed embodiments relate to a system (23) and method (400) for maintaining synchronization between a video signal (29) and an audio signal (31) that are processed using clocks that are locked. The system (23) may comprise a component (34) that determines at least one initial level of a buffer, a component (34) that determines at least one current level of the buffer, and a component (34) that determines an amount of drift by comparing the at least one initial level of the buffer to the at least one current level of the buffer and adjusts the clocks to maintain the initial midpoint level of the buffer if the amount of drift reaches a threshold level.

DETAILED DESCRIPTION OF THE PREFERRED EMBODIMENT

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention allows an audio/video receiver (for example, digital TVs, including HDTV) to present audio and video in synchronization when the source audio clock and source video clock are not locked and the digital TV audio and video clocks are locked. Moreover, the present invention may be useful for maintaining lip synch with unlocked audio and video clocks of digital sources, such as Moving Pictures Experts Group (MPEG) sources. Embodiments of the present invention may relate to a system and method for determining relational lip synch between audio and video in a digitized video and audio environment using buffer calculation. Lip synch between digitized audio and video may be improved by making specific measurements of the audio and video buffers and interpreting this information to determine the lip synch offset in time.

Figure 1:
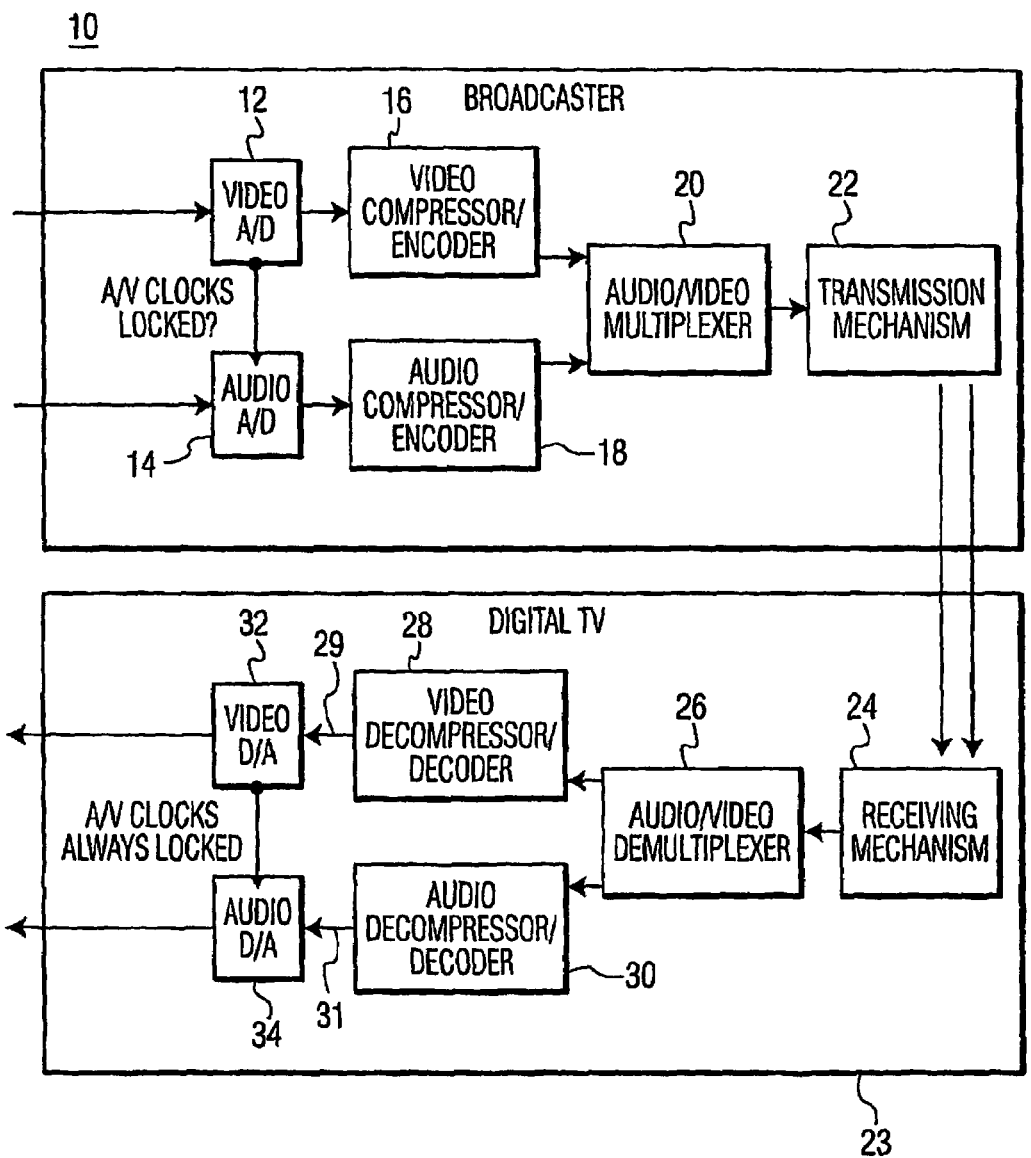
FIG. 1 is a block diagram of an exemplary system in which the present invention may be implemented.

FIG. 1 is a block diagram of an exemplary system in which the present invention may be implemented. The system is generally referred to by the reference numeral 10. Those of ordinary skill in the art will appreciate that the components shown in FIG. 1 are for purposes of illustration only. Systems that embody the present invention may be implemented using additional elements or subsets of the components shown in FIG. 1. Additionally, the functional blocks shown in FIG. 1 may be combined together or separated further into smaller functional units.

A broadcaster site includes a video A/D converter 12 and an audio A/D converter 14, which respectively process a video signal and a corresponding audio signal prior to transmission. The video A/D converter 12 and the audio A/D converter 14 are operated by separate clock signals. As shown in FIG. 1, the clocks for the video A/D converter 12 and the audio A/D converter 14 are not necessarily locked. The video A/D converter 12 may include a motion-compensated predictive encoder utilizing discrete cosine transforms. The video signal is delivered to a video compressor/encoder 16 and the audio signal is delivered to an audio compressor/encoder 18. The compressed video signal may be arranged, along with other ancillary data, according to some signal protocol such as MPEG or the like.

The outputs of the video compressor/encoder 16 and the audio compressor/encoder 18 are delivered to an audio/video multiplexer 20. The audio/video multiplexer 20 combines the audio and video signals into a single signal for transmission to an audio/video receiving unit. As will be appreciated by those of ordinary skill in the art, strategies such as time division multiplexing may be employed by the audio/video multiplexer 20 to combine the audio and video signals. The output of the audio/video multiplexer 20 is delivered to a transmission mechanism 22, which may amplify and broadcast the signal.

An audio/video receiver 23, which may comprise a digital television, is adapted to receive the transmitted audio/video signal from the broadcaster site. The signal is received by a receiving mechanism 24, which delivers the received signal to an audio/video demultiplexer 26. The audio/video multiplexer 26 demultiplexes the received signal into video and audio components. A demultiplexed video signal 29 is delivered to a video decompressor/decoder 28 for further processing. A demultiplexed audio signal 31 is delivered to an audio decompressor/decoder 30 for further processing.

The output of the video decompressor/decoder 28 is delivered to a video D/A converter 32 and the output of the audio decompressor/decoder 30 is delivered to an audio D/A converter 34. As shown in FIG. 1, the clocks of the video D/A converter 32 and the audio D/A converter 34 are always locked. The outputs of the video D/A converter 32 and the audio D/A converter 34 are used to respectively create a video image and corresponding audio output for the entertainment of a viewer.

Even though the hardware in the exemplary system of FIG. 1 does not allow for separate control of the audio and video presentation, it has the ability, using embodiments of the present invention, to determine if such control is necessary. In accordance with embodiments of the present invention, the relative transport timing associated with the received audio and video signals is measured by observing the level of the received audio buffer. The level of the audio buffer has been observed to be a relatively accurate measure of lip-synch error.

If audio and video signals are properly synchronized initially, then received video data and audio data should be consumed at the same rate during playback. In that case, the buffer that holds audio information should remain at about the same size over time without growing or shrinking. If the audio buffer does grow or shrink in excess of a typically stable range, this is an indication that proper lip synch may be compromised. For example, if the audio buffer grows beyond a typical range over time, this is an indication that the video signal may be leading the audio signal. If the audio buffer shrinks below its typical range, this is an indication that the video signal may be lagging the audio signal. When the lip synch error is determined to be near zero over time (i.e. the audio buffer remains at a relatively constant size over time), it may be assumed that the audio A/D source clock was locked to the video A/D source clock. If lip synch error grows over time, then the audio A/D and video A/D source clocks were not necessarily locked and correction may be required.

Those of ordinary skill in the art will appreciate that embodiments of the present invention may be implemented in software, hardware, or a combination thereof. Moreover, the constituent parts of the present invention may be disposed in the video decompressor/decoder 28, the audio decompressor/decoder 30, the video D/A converter 32 and/or the audio D/A converter 34 or any combination thereof. Additionally, the constituent components or functional aspects of the present invention may be disposed in other devices that are not shown in FIG. 1.

Whenever a new audio/video presentation begins, usually during a channel change, embodiments of the present invention may store the initial audio D/A input buffer level into memory. This data may be stored within the video D/A converter, the audio D/A converter 34 or external thereto.

If the audio source clock was locked to the video source when the signal was transmitted by the broadcaster, then the buffer level should remain relatively constant over time. If the buffer level is drifting and the drift corresponds to a lip synch error beyond roughly +/−10 ms, the normal clock recovery control may be disabled and the locked clocks of the video D/A converter 32 and the audio D/A converter 34 may be moved in a direction that returns the audio buffer level to its initial level.

While this process returns the audio buffer to its initial level, the degree to which the video is being moved from its original position is also measured. When the video is displaced by roughly +/−25 ms, the process may either repeat a video frame (for example, by re-initializing the measurement of the initial audio input buffer level) or drop a video frame (e.g., an MPEG frame of the received video) to negate the measured displacement.

The process continues in the mode of locking the audio output to the audio source and skipping or repeating video frames to negate any video drift until another channel change is detected. After a new channel change, embodiments of the present invention may cease to correct lip synch error, allowing the system to return to a conventional method of locking video output to video input until a new lip synch error is detected.

The algorithm used to control the locked audio and video output clocks based upon the initial audio output D/A input buffer level and the actual audio output D/A input buffer level is very important for stable performance. It is preferred to have a response where the buffer level is turned around quickly when it is moving away from the target, moves quickly towards the target when it is relatively far away, and decelerates as it approaches the desired position. This may be accomplished, for example, by creating two control tables that relate the clock frequency change to relative position and rate of change.

Table 1 relates the clock frequency change to the relative rate of change:

TABLE 1

| Frequency Change (Hz) | Relative Rate of Change (Bytes) |
|---|---|
| −430 | v < −2000 |
| −354 | −2000 < v < −1800 |
| −286 | −1800 < v < −1600 |
| −226 | −1600 < v < −1400 |
| −174 | −1400 < v < −1200 |
| −130 | −1200 < v < −1000 |
| −94 | −1000 < v < −800 |
| −62 | −800 < v < −600 |
| −46 | −600 < v < −400 |
| −34 | −400 < v < −200 |
| 0 | −200 < v < 200 |
| 34 | 200 < v < 400 |
| 46 | 400 < v < 600 |
| 62 | 600 < v < 800 |
| 94 | 800 < v < 1,000 |
| 130 | 1000 < v < 1200 |
| 174 | 1200 < v < 1400 |
| 226 | 1400 < v < 1600 |
| 286 | 1600 < v < 1800 |
| 354 | 1800 < v < 2000 |
| 430 | 2000 < v |

Table 2 relates the clock frequency change to the relative distance:

TABLE 2

| Frequency Change (Hz) | Relative Distance (Bytes) |
|---|---|
| −100 | x < −4000 |
| −90 | −4000 < x < −3600 |
| −80 | −3600 < x < −3200 |
| −70 | −3200 < x < −2800 |
| −60 | −2800 < x < −2400 |
| −50 | −2400 < x < −2000 |
| −40 | −2000 < x < −1600 |
| −30 | −1600 < x < −1200 |
| −20 | −1200 < x < −800 |
| −10 | −800 < x < −400 |
| 0 | −400 < x < 400 |
| 10 | 400 < x < 800 |
| 20 | 800 < x < 1200 |
| 30 | 1200 < x < 1600 |
| 40 | 1600 < x < 2000 |
| 50 | 2000 < x < 2400 |
| 60 | 2400 < x < 2800 |
| 70 | 2800 < x < 3200 |
| 80 | 3200 < x < 3600 |
| 90 | 3600 < x < 4000 |
| 100 | 4000 < x |

Those of ordinary skill in the art will appreciate that the values shown in Table 1 and Table 2 are exemplary and should not be construed to limit the present invention. Since the buffer level has an irregular input rate due to the audio decode and a very regular output rate due to the D/A output clock, the buffer level data will typically have some erratic jitter. In order to eliminate some of this jitter, the buffer level is estimated to be the midpoint between the largest buffer reading and the smallest buffer reading over a 30 second time period. This midpoint may be calculated periodically (for example, every 30 seconds) and may give a good reading of the difference between the audio source A/D clock frequency and the audio output D/A clock frequency over time.

Figure 2:
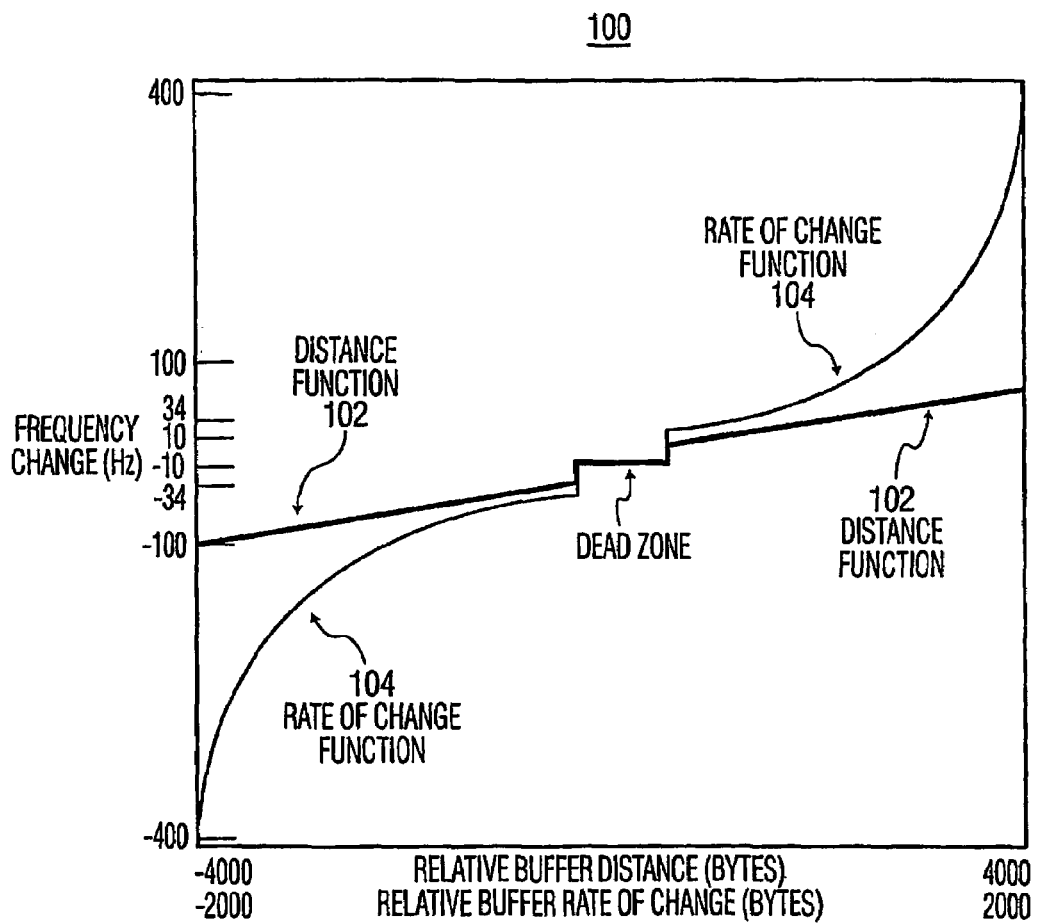
FIG. 2 is a graphical illustration corresponding to buffer control tables that may be implemented in embodiments of the present invention.

Referring now to FIG. 2, a chart graphically illustrating the buffer control tables (discussed above) is shown. The chart is generally referred to by the reference numeral 100. A distance function 102 and a rate of change function 104 are illustrated in FIG. 2. The y-axis of the chart 100 corresponds to a relative frequency change in hertz. The x-axis of the chart 100 corresponds to the relative buffer distance in bytes for the distance function 102 and the relative buffer rate of change in bytes for the rate of change function 104. Those of ordinary skill in the art will appreciate that the values shown in, the chart 100 are exemplary and should not be construed to limit the present invention.

The chart 100 illustrates how embodiments of the present invention will cause the frequency compensation to be relatively large in the proper direction when the buffer level is far away from the initial position and the rate of change is in the wrong direction. This large frequency compensation will continue until the rate of change switches and the buffer level moves in the correct direction. At this point the velocity component will begin to work against the position component. However, as long as the position component is greater than the rate of change component, the frequency will be pushed to increase the rate of change towards the target and the distance will decrease. Once the rate of change component becomes larger than the distance component, the rate of change will begin to decrease. This action will serve to smoothly brake the rate of change as the distance component approaches the desired initial buffer level.

Embodiments of the present invention may determine lip synch drift of the by establishing an initial buffer level, monitoring a drift in a leading edge of the buffer, and making adjustments to the system to reduce the drift. It should be noted that the steps of monitoring and of making system adjustments preferably continue until the lip synch drift has been corrected.

The initial operating levels of the buffer must be established to determine a starting point for lip synch correction. The starting point should be determined to be at a level where lip synch is the most accurate. Thus, the starting point may then be used as a target for the buffer calculation. The operation of a buffer in accordance with embodiments of the present invention is generally explained with reference to FIG. 3.

Figure 3:
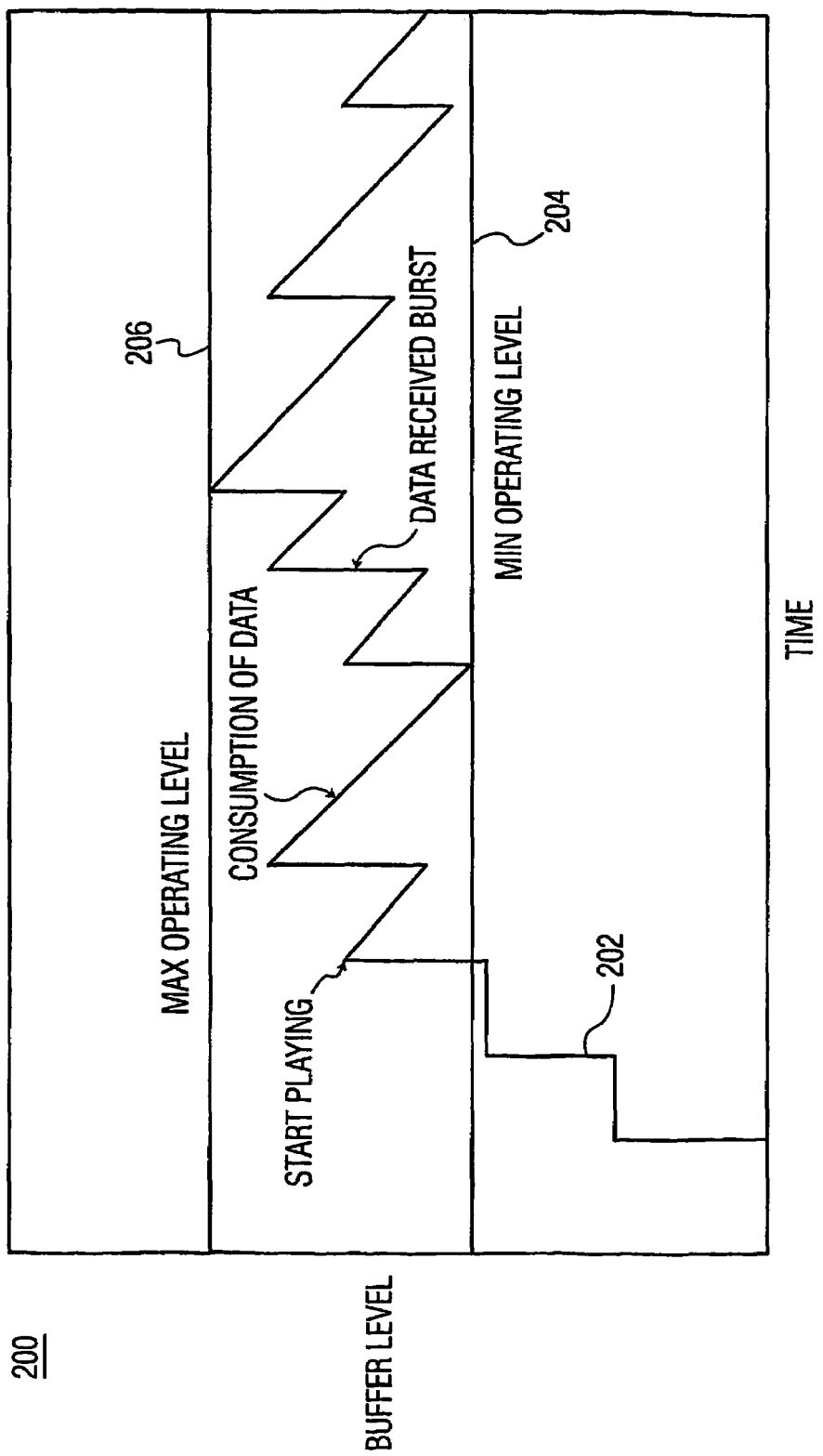
FIG. 3 is a graphical illustration of the change in the amount of data stored in a buffer (i.e., buffer level) over time.

FIG. 3 is a graphical illustration of the change in the amount of data stored in a buffer (i.e., buffer level) over time. The graph is generally referred to by the reference numeral 200. A trace 202 illustrates an amount of data that is stored in a receive buffer. For purposes of illustration, the trace 202 indicates the amount of data stored in an audio receive buffer. A minimum operating level 204 and a maximum operating level 206 are illustrated in the graph 200. If the amount of data stored in the buffer drops below the minimum operating level 204, the playback device in which the buffer resides may be in danger of running out of data to play back. If the amount of data in the buffer exceeds the maximum operating level 206, the buffer may overflow and playback data may be lost. The minimum operating level 204 and the maximum operating level 206 may be predefined or they may be determined by measuring the operational characteristics of the buffer when it is in use.

The graph 200 illustrates how the buffer level initially starts at zero and grows by bursts until it is determined that data can begin to be output (for example, played back to a user). The sloped lines in the graph represent where the buffers are being depleted by outputting their data at a constant rate. The data bursts happen at a constant rate over time, but burst clusters can occur. Burst clusters can affect the overall buffer level. In a relatively short period of time, the minimum and maximum operating levels may be determined because the amount of data stored in the buffer typically settles between minimum and maximum levels relatively quickly (for example, within about 30 seconds). Thus, an accurate lip synch target range can be quickly established by monitoring the maximum operating level and the minimum operating level over a period of time (for example, 30 seconds).

Over time, a drift in the leading edge of the buffer may occur if the source and destination clocks for the video and audio components of a data stream are not locked. For example, if the destination clock is fast with respect to the source clock, the buffer will eventually deplete.

Figure 4:
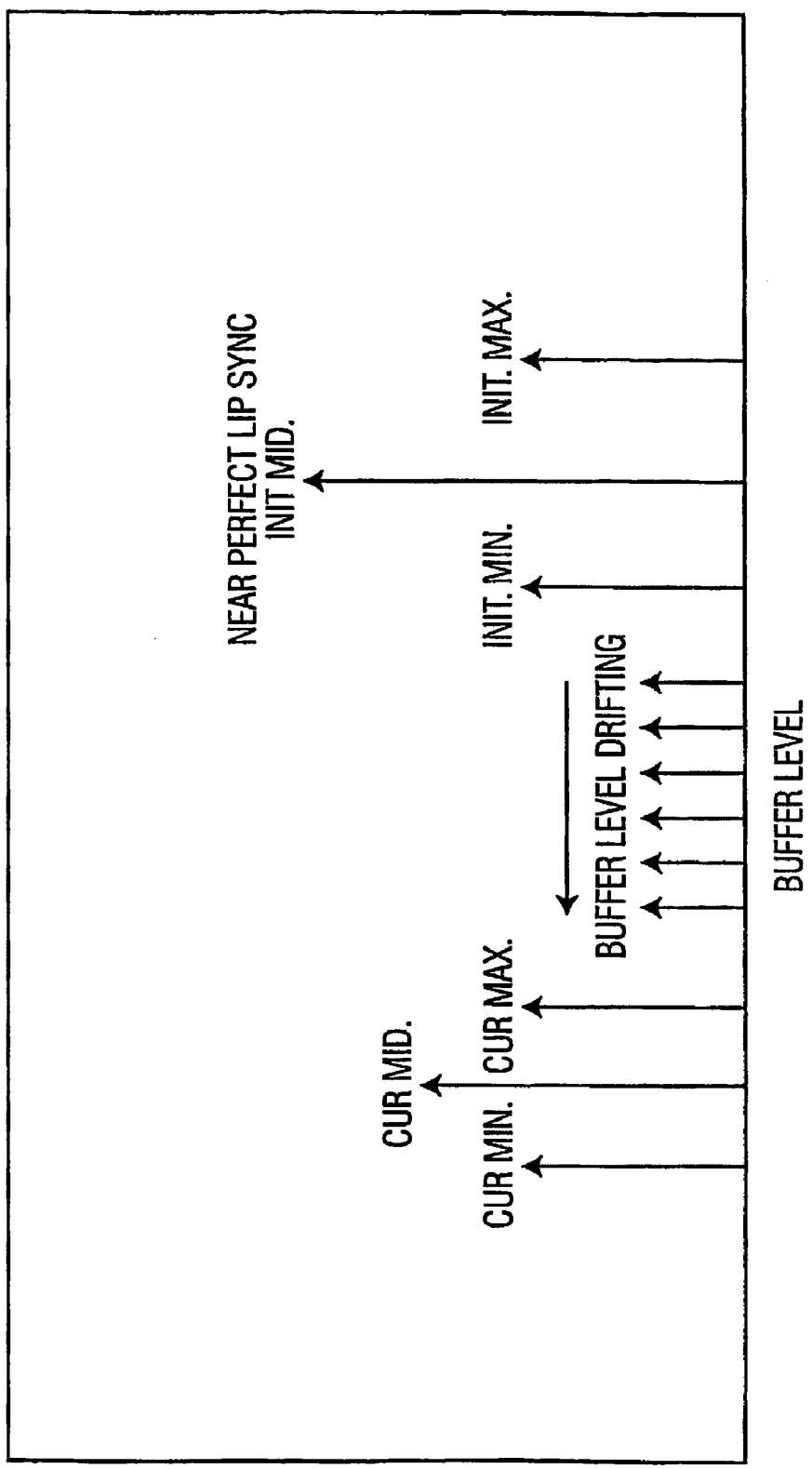
FIG. 4 is a graphical illustration of how the buffer level is monitored and adjusted in accordance with the present invention.

FIG. 4 is a graphical illustration of how the buffer level is monitored and adjusted in accordance with the present invention. The graph is generally referred to by the reference numeral 300. Initial buffer levels, which are referred to as Init Min, Init Max, and Init Mid in the example shown in FIG. 4, are calculated to establish a target where lip synch is good. In the example illustrated in FIG. 4, the destination clock is faster then the source clock. As a result, the current buffer values are slowly depleting. Current buffer values are identified as Cur Min, Cur Max and Cur Mid. The leading edge (Cur Min) is an important measurement at this stage because it may be used to calculate the location of the operating midpoint (Cur Mid) using the following equations:

Init Mid=(Init Max+Init Min)/2

Operating Midpoint=Cur Mid=Cur Min+Init Mid−Init Min

After the operating midpoint is located, the next step is to make adjustments to the system until the operating midpoint (Cur Mid) is equal to Init Mid. In the example shown in FIG. 4 in which the buffer level is being depleted, a clock signal that controls consumption of the data stored in the buffer may be slowed as described above so that rate of the depletion is reduced.

As the clock rate that controls the buffer is adjusted, new values for Cur Max, Cur Min continue to be detected and a new value for Cur Mid continues to be computed. In the example shown in FIG. 4, successive measurements of Cur Min would continue to decrease because the buffer is being depleted. In the case of buffer depletion, the value of Cur Max may be reset when corrective action is taken. This allows the Cur Max variable to be recalculated and will help determine if corrective action in the correct direction is taking place.

Moreover, changes in the Cur Max and Cur Min variables may be monitored to determine the effects of the corrective efforts to bring Cur Mid toward Init Mid. If the buffer is depleting, a determination may be made about whether more adjustment needs to be made by monitoring by how much Cur Min is decreasing or by how much Cur Max is increasing. In this manner, it is possible to monitor both Cur Mid position and velocity or speed of convergence with Init Mid.

Figure 5:
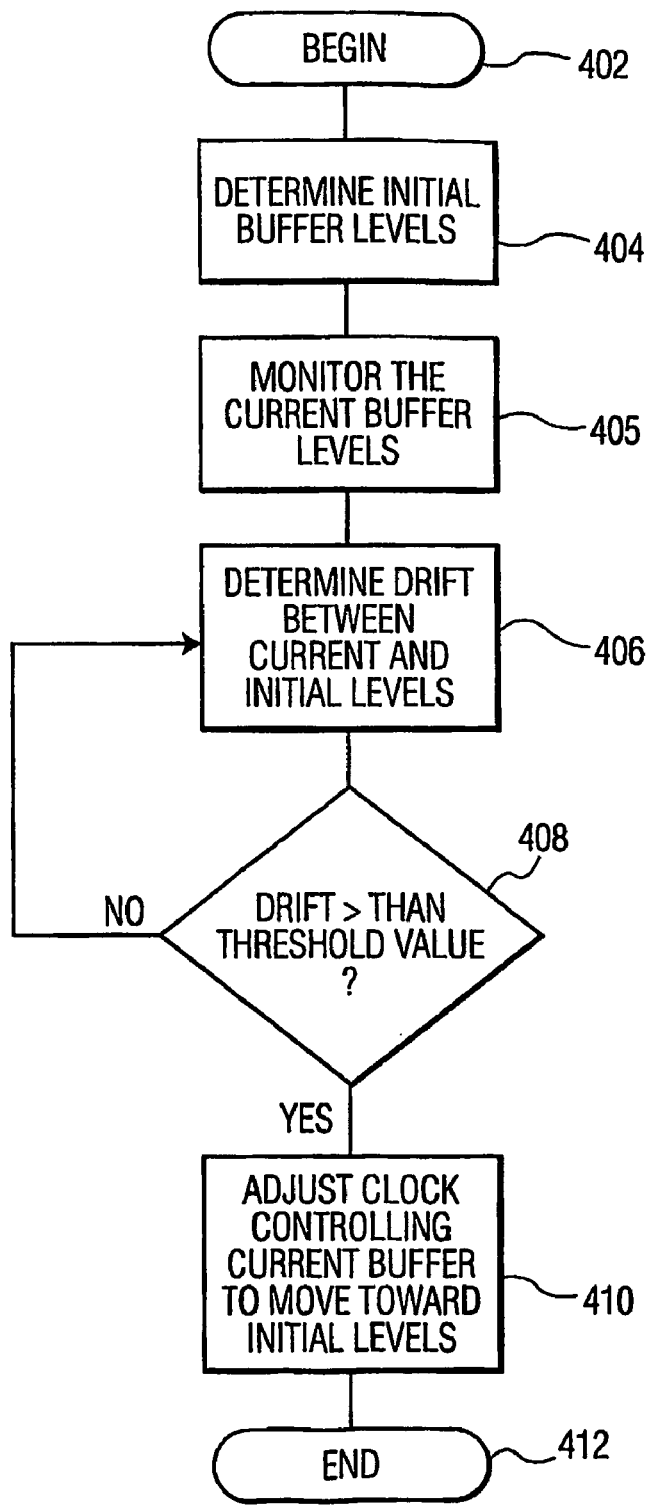
FIG. 5 is a process flow diagram illustrating a process in accordance with embodiments of the present invention.

FIG. 5 is a process flow diagram illustrating a process in accordance with embodiments of the present invention. The process is generally referred to by the reference numeral 400. At block 402, the process begins.

At block 404, the initial audio input buffer levels are determined. The initial buffer levels may comprise an initial minimum operating level (Init Min), an initial maximum operating level (Init Max), and an initial midpoint level (Init Mid). The current buffer levels are monitored over time, as shown at block 405. The current buffer levels may include a current minimum operating level (Cur Min), a current maximum operating level (Cur Max), and a current midpoint level (Cur Mid). Over time, the amount of drift of the initial audio input buffer level is determined, as shown at block 406. If the drift exceeds a threshold (block 408), then the locked clocks of the video D/A converter 32 (FIG. 1) and the audio D/A converter 34 may be adjusted in the direction that maintains the initial buffer levels (block 410). At block 412, the process ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A system that maintains synchronization between a video signal and an audio signal that are processed using clocks that are locked, the system comprising:

a component that determines an initial minimum operating level, an initial maximum operating level, and an initial midpoint level of a buffer, the initial midpoint level is computed as being equal to half of the initial maximum operating level plus half of the initial minimum operating level;

a component that determines at least one current level of the buffer; and a component that determines an amount of drift by comparing at least one of the initial minimum operating level, the initial maximum operating level, and the initial midpoint level of the buffer to the at least one current level of the buffer and adjusts the clocks to maintain the initial midpoint level of the buffer if the amount of drift reaches a threshold level.

2. The system set forth in claim 1, wherein the at least one current level of the buffer comprises a current midpoint level.

3. The system set forth in claim 1, wherein the at least one current level of the buffer comprises a current minimum operating level, a current maximum operating level, and a current midpoint level.

4. The system set forth in claim 3, wherein the current midpoint level is calculated as being equal to the current minimum operating level plus the initial midpoint level minus the initial minimum operating level.

5. The system set forth in claim 1, wherein the audio signal and the video signal comprise a Motion Picture Experts Group (MPEG) signal.

6. The system set forth in claim 1, wherein the system comprises a portion of a television set.

7. The system set forth in claim 6, wherein the television set comprises a High Definition Television (HDTV) set.

8. A system that maintains synchronization between a video signal and an audio signal that are processed using clocks that are locked, the system comprising:
    means for determining an initial minimum operating level, an initial maximum operating level, and an initial midpoint level of a buffer, the initial midpoint level is computed as being equal to half of the initial maximum operating level plus half of the initial minimum operating level;
    means for determining at least one current level of the buffer;
    means for determining an amount of drift by comparing at least one of the initial minimum operating level, the initial maximum operating level, and the initial midpoint level of the buffer to the at least one current level of the buffer; and
    means for adjusting the clocks to maintain the initial midpoint level of the buffer if the amount of drift reaches a threshold level.

9. The system set forth in claim 8, wherein the at least one current level of the buffer comprises a current midpoint level.

10. The system set forth in claim 8, wherein the at least one current level of the buffer comprises a current minimum operating level, a current maximum operating level, and a current midpoint level.

11. The system set forth in claim 10, wherein the current midpoint level is calculated as being equal to the current minimum operating level plus the initial midpoint level minus the initial minimum operating level.

12. A method of maintaining synchronization between a video signal and an audio signal that are processed using clocks that are locked, the method comprising:
    determining an initial minimum operating level, an initial maximum operating level, and an initial midpoint level of a buffer, the initial midpoint level is computed as being equal to half of the initial maximum operating level plus half of the initial minimum operating level;
    determining at least one current level of the buffer; and
    determining an amount of drift by comparing at least one of the initial minimum operating level, the initial maximum operating level, and the initial midpoint level of the buffer to the at least one current level of the buffer; and
    adjusting the clocks to maintain the initial midpoint level of the buffer if the amount of drift reaches a threshold level.

13. The method set forth in claim 12, comprising:
    defining the at least one current level of the buffer to comprise a current minimum operating level, a current maximum operating level, and a current midpoint level; and
    computing the current midpoint level (Cur Mid) as being equal to the current minimum operating level plus the initial midpoint level minus the initial minimum operating level.

14. A system that maintains synchronization between a video signal and an audio signal that are processed using clocks that are locked, the system comprising:
    a component that determines an initial minimum operating level, an initial maximum operating level, and an initial midpoint level of a buffer;
    a component that determines a current minimum operating level, a current maximum operating level, and a current midpoint level of the buffer, the current midpoint level is calculated as being equal to the current minimum operating level plus the initial midpoint level minus the initial minimum operating level; and
    a component that determines an amount of drift by comparing at least one of the initial minimum operating level, the initial maximum operating level, and the initial midpoint level of the buffer to the at least one of the current minimum operating level, the current maximum operating level, and the current midpoint level of the buffer and adjusts the clocks to maintain the initial midpoint level of the buffer if the amount of drift reaches a threshold level.

15. A system that maintains synchronization between a video signal and an audio signal that are processed using clocks that are locked, the system comprising:
    means for determining an initial minimum operating level, an initial maximum operating level, and an initial midpoint level of a buffer;
    means for determining a current minimum operating level, a current maximum operating level, and a current midpoint level of the buffer, the current midpoint level is calculated as being equal to the current minimum operating level plus the initial midpoint level minus the initial minimum operating level;
    means for determining an amount of drift by comparing at least one of the initial minimum operating level, the initial maximum operating level, and the initial midpoint level of the buffer to the at least one of the current minimum operating level, the current maximum operating level, and the current midpoint level of the buffer; and
    means for adjusting the clocks to maintain the initial midpoint level of the buffer if the amount of drift reaches a threshold level.

16. A method of maintaining synchronization between a video signal and an audio signal that are processed using clocks that are locked, the method comprising:
    determining an initial minimum operating level, an initial maximum operating level, and an initial midpoint level of a buffer;
    determining a current minimum operating level, a current maximum operating level, and a current midpoint level of the buffer, the current midpoint level is calculated as being equal to the current minimum operating level plus the initial midpoint level minus the initial minimum operating level;
    determining an amount of drift by comparing at least one of the initial minimum operating level, the initial maximum operating level, and the initial midpoint level of the buffer to the at least one of the current minimum operating level, the current maximum operating level, and the current midpoint level of the buffer; and adjusting the clocks to maintain the initial midpoint level of the buffer if the amount of drift reaches a threshold level.

17. A system that maintains synchronization between a video signal and an audio signal that are processed using clocks, the system comprising:
   a component that determines an initial minimum operating level, an initial maximum operating level, and an initial midpoint level of a buffer, the initial midpoint level being derived from the initial maximum operating level and the initial minimum operating level;
   a component that determines at least one current level of the buffer; and
   a component that determines an amount of drift by comparing at least one of the initial minimum operating level, the initial maximum operating level, and the initial midpoint level of the buffer to the at least one current level of the buffer and adjusts the clocks to maintain the initial midpoint level of the buffer if the amount of drift reaches a threshold level.

18. A system that maintains synchronization between a video signal and an audio signal that are processed using clocks, the system comprising:
   means for determining an initial minimum operating level, an initial maximum operating level, and an initial midpoint level of a buffer, the initial midpoint level being derived from the initial maximum operating level and the initial minimum operating level;
   means for determining at least one current level of the buffer;
   means for determining an amount of drift by comparing at least one of the initial minimum operating level, the initial maximum operating level, and the initial midpoint level of the buffer to the at least one current level of the buffer; and
   means for adjusting the clocks to maintain the initial midpoint level of the buffer if the amount of drift reaches a threshold level.

19. A method of maintaining synchronization between a video signal and an audio signal that are processed using clocks, the method comprising:
   determining an initial minimum operating level, an initial maximum operating level, and an initial midpoint level of a buffer, the initial midpoint level being derived from the initial maximum operating level and the initial minimum operating level;
   determining at least one current level of the buffer; and
   determining an amount of drift by comparing at least one of the initial minimum operating level, the initial maximum operating level, and the initial midpoint level of the buffer to the at least one current level of the buffer; and
   adjusting the clocks to maintain the initial midpoint level of the buffer if the amount of drift reaches a threshold level.

20. A system that maintains synchronization between a video signal and an audio signal that are processed using clocks that are locked, the system comprising:
   a component that determines an initial minimum operating level, an initial maximum operating level, and an initial midpoint level of a buffer;
   a component that determines a current minimum operating level, a current maximum operating level, and a current midpoint level of the buffer, the current midpoint level is derived from the current minimum operating level, the initial midpoint level and the initial minimum operating level; and
   a component that determines an amount of drift by comparing at least one of the initial minimum operating level, the initial maximum operating level, and the initial midpoint level of the buffer to the at least one of the current minimum operating level, the current maximum operating level, and the current midpoint level of the buffer of the buffer and adjusts the clocks to maintain the initial midpoint level of the buffer if the amount of drift reaches a threshold level.

21. A system that maintains synchronization between a video signal and an audio signal that are processed using clocks, the system comprising:
   means for determining an initial minimum operating level, an initial maximum operating level, and an initial midpoint level of a buffer;
   means for determining a current minimum operating level, a current maximum operating level, and a current midpoint level of the buffer, the current midpoint level is derived from the current minimum operating level, the initial midpoint level, and the initial minimum operating level;
   means for determining an amount of drift by comparing at least one of the initial minimum operating level, the initial maximum operating level, and the initial midpoint level of the buffer to the at least one of the current minimum operating level, the current maximum operating level, and the current midpoint level of the buffer; and
   means for adjusting the clocks to maintain the initial midpoint level of the buffer if the amount of drift reaches a threshold level.

22. A method of maintaining synchronization between a video signal and an audio signal that are processed using clocks, the method comprising:
   determining an initial minimum operating level, an initial maximum operating level, and an initial midpoint level of a buffer;
   determining a current minimum operating level, a current maximum operating level, and a current midpoint level of the buffer, the current midpoint level being derived from the current minimum operating level, the initial midpoint level, and the initial minimum operating level;
   determining an amount of drift by comparing at least one of the initial minimum operating level, the initial maximum operating level, and the initial midpoint level of the buffer to the at least one of the current minimum operating level, the current maximum operating level, and the current midpoint level of the buffer; and
   adjusting the clocks to maintain the initial midpoint level of the buffer if the amount of drift reaches a threshold level.

* * * * *